Feb. 3, 1970     J. W. HENDRY     3,492,699

BLOW MOLDING PLASTICIZING APPARATUS

Filed July 31, 1967     3 Sheets-Sheet 1

INVENTOR.
JAMES W. HENDRY
BY
Woodhams, Blanchard & Flynn
ATTORNEYS

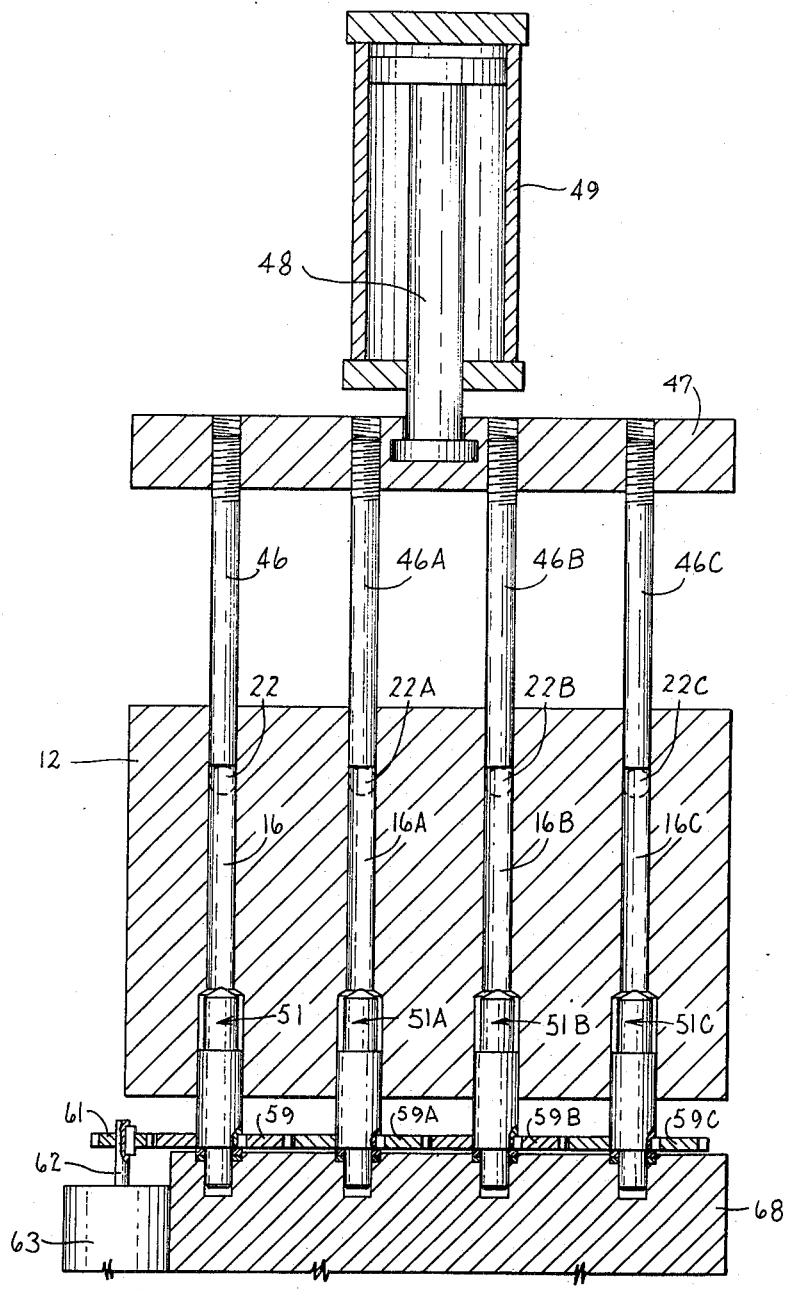

INVENTOR.
JAMES W. HENDRY
BY
Woodhams, Blanchard & Flynn
ATTORNEYS

United States Patent Office 3,492,699
Patented Feb. 3, 1970

3,492,699
BLOW MOLDING PLASTICIZING APPARATUS
James W. Hendry, Helena, Ohio, assignor to Borg-Warner Corporation, Chicago, Ill., a corporation of Illinois
Filed July 31, 1967, Ser. No. 657,249
Int. Cl. B29f 1/12
U.S. Cl. 18—30　　　　　　　　　　　　　　12 Claims

ABSTRACT OF THE DISCLOSURE

A plasticizing apparatus with a housing having, in one preferred embodiment, an inclined feed opening therein, the feed opening having a reciprocating ram slideable therein and a conical plasticizing rotor mounted at the lower end of the opening. A feed hopper is positioned directly above the feed opening and deposits a predetermined amount of particulate plastic material into a movable feed block which in turn deposits the material into the feed opening. The feed block contains an adjustable sleeve to permit precise control over the amount of material deposited into the plasticizing apparatus. The material deposited into the feed opening moves through the feed opening into contact with the plasticizing rotor and is compressed thereagainst by the ram whereby the particulate material is plasticized and then passes out through an opening for blow molding of articles. The plasticizing apparatus preferably contains a plurality of parallel feed openings therein, each containing a plasticizing element and a reciprocating ram therein, all of which are driven simultaneously. Individual hoppers are located above each of the feed openings with a common movable feed block interconnecting the individual hoppers with their respective feed barrels whereby each feed opening is capable of plasticizing and producing blow molded articles of different colors, sizes and shapes.

FIELD OF THE INVENTION

This invention relates to a blow molding plasticizing apparatus wherein the plasticizing is accomplished by means of a conical plasticizing rotor.

DESCRIPTION OF PRIOR ART

Blow molding plasticizing apparatus of various types are presently in existence. The majority of such plasticizing devices frequently utilize a rotating screw plasticizing element wherein granular plastic material is fed into a feed barrel adjacent one end of the screw with the material being progressively, axially moved along the barrel by means of the screw, the material being heated, compressed and mechanically worked by the screw as it travels therealong whereby the material is plasticized. The material then generally passes through an orifice or outlet opening and into a mold for blow molding thereof.

Rotating screw-type plasticizing machines for use in blow molding have previously been considered undesirable for many uses since the rotating screw plasticizing device is essentially a continuous but imprecise, plasticizing means, requiring a continuous flow of material into and out of the screw for a successful plastification thereof. Thus, it is essentially impossible to plasticize a precisely controlled amount or quantity of particulate material, which is an essential step in the blow molding process since a properly formed blow molded article requires a precise and measured amount of plastic material for the formation thereof. The prior plasticizing devices utilizing rotating screws have thus required the utilization of separate measuring and dispensing means interconnected to the plasticizing screw when it is desired to utilize the same for blow molding. These devices have, in one form thereof (see Modern Plastics, October 1963, pp. 188–193), commonly consisted of an accumulation chamber for receiving the plasticizing material upon leaving the rotating screw, which chamber is further in communication with a piston or other similar measuring means for permitting a precise quantity of material to be metered into the blow molding apparatus. In another form thereof, these prior devices have utilized a continuous tubular extrusion from which sections were taken to form parisons (see U.S. Patent to Elmer E. Mills, No. 2,515,093).

The use of the additional accumulation chambers and metering equipment necessary when a rotating screw plasticizing device is utilized for blow molding has disadvantages in that the use of such auxiliary equipment generally requires that the material within the chamber be heated so as to maintain the material at a workable temperature for carrying out the blow molding operation since the material is not utilized immediately upon leaving the plasticizing screw. Further, storage of this material in the accumulation chamber may cause the chamber and the metering means to become clogged with plastic material which has hardened therein, and thus requires periodic disassembling and cleaning of the device so as to insure proper operation thereof. The use of continuous plastic extrusions involves a serious waste of material in the unused portions between the portions comprising the parisons.

Further, the plasticizing or metering devices utilized in the prior art plasticizing machines have usually been of a rather complicated nature and thus have not permitted a ready and easy interchange thereof so as to permit the quantity of plasticized material utilized in the blow molding operation to be varied. This is highly undesirable in the blow molding art since each individual article requires a precise quantity of plasticized material for the formation thereof and thus it is desirable to be able to vary the quantity of material in a simple and efficient manner.

Still another disadvantage of the prior art plasticizing devices has been the inability to rapidly and inexpensively convert the machine for use with different colored plastics. In the blow molding art, it is generally desirable to produce a quantity of one colored plastic article and then produce a quantity of the same article of a different color. In the screw-type plasticizing devices, this has usually necessitated the disassembly of the plasticizing machine so that the screw, the accumulation chamber, and the metering device can all be thoroughly cleaned so as to prevent the intermixture of the different colors. Due to the mechanical complexity involved, this has been an extremely time-consuming and expensive operation.

SUMMARY OF THE INVENTION

The present invention relates to a new and improved blow molding plasticizing apparatus for permitting precise control over the quantity of material plasticized and utilized for forming the blow molded article. Further, the plasticizing device is of extreme simplicity whereby it is readily adaptable and interchangeable for use with various colored plastic materials.

In particular, the plasticizing apparatus comprises a feed barrel having an opening therethrough, the opening in a preferred construction being inclined with respect to a horizontal position at an angle of preferably 30°. The lower end of the opening contains a rotating conical plasticizing element therein while the other end of the opening contains a reciprocating ram member. The feed barrel is further provided with an inlet feed opening which communicates with the feed barrel opening in the region between the ram and the plasticizing element. Positioned above the feed barrel is a hopper containing particulate plastic material, the hopper having a food opening in the bottom thereof which is laterally displaced from the inlet feed opening contained within the feed barrel.

Positioned between the bottom of the hopper and the top of the feed barrel is a slideable feed block which contains an opening therethrough, which opening receives therein a cup or sleeve member having a central opening or passageway therein whereby the sleeve can be readily removed and replaced by another sleeve so as to permit the volume of the central opening to be varied. The reciprocal feed block is positioned beneath the hopper feed opening whereby material falls from the hopper into the central opening of the cup member, the lower end of the cup member being closed by being positioned over the top of the feed barrel. After the cup has been filled with granular material, which cup then contains a predetermined quantity of material, the feed block is reciprocably moved out from beneath the hopper feed openings so as to close the same. The feed block is moved until the cup is positioned directly over the inlet feed opening contained in the barrel whereby the material contained in the central opening of the cup falls by gravity through the inlet feed opening into the feed barrel opening of the plasticizing device. Due to the angular inclination of the feed barrel in the illustrated embodiments, the plastic material deposited therein then slides by means of gravity downwardly along the openings until the material comes into contact with the conical point of the plasticizing rotor. The ram is then moved linearly forwardly to contact the plastic material and compress and compress the same against the conical rotating face of the rotor. In its forward movement, the ram effectively closes off the inlet feed opening so as to prevent any more plastic material from being deposited into the device. The ram thus compresses the material against the rotor whereby the material is plasticized and caused to move outwardly through a passage into a blow molding device for the formation of a parison.

Further, if desired, the plasticizing apparatus described above can be provided with a plurality of parallel feed openings therein, each having a reciprocating ram and rotating plasticizing element mounted therein. Each feed opening has a separate hopper located thereabove for the source of plastic material. A single feed block having volume measuring cups therein is positioned between the row of hoppers and the row of parallel feed openings whereby each hopper fills its respective measuring cup in one position of operation, after which the feed block is then moved to a second position so as to deposit the material from each cup into its respective feed barrel and the material is then compressed against its respective rotor by means of the ram. In this mode of operation, the rams are all preferably connected to a single power source so as to be operated simultaneously and the plasticizing rotors are also preferably connected to a single power source so as to be simultaneously rotated. In this manner, a single device is capable of simultaneously producing a plurality of blow molded articles. Furthermore, by using individual hoppers, each hopper can be filled with a different colored plastic material whereby various colored articles of different shapes and sizes can be simultaneously blow molded.

Accordingly, in view of the description of the present invention as set forth above, and further in view of the disadvantages of the prior art as described above, the primary object of the present invention is to provide an improved plasticizing apparatus for use in blow molding, and in particular to provide:

(1) A plasticizing apparatus capable of plasticizing a precise quantity of plastic material.

(2) A plasticizing apparatus, as aforesaid, wherein the precise quantity of material plasticized can be easily and simply varied.

(3) A plasticizing apparatus, as aforesaid, utilizing a conical plasticizing rotor so as to permit percise control over the volume of material plasticized.

(4) A plasticizing apparatus, as aforesaid, wherein the feed barrel is inclined with respect to a horizontal position whereby the granular material will fall by means of gravity into contact with the plasticizing rotor.

(5) A plasticizing apparatus, as aforesaid, wherein a ram is utilized to compress the material against the rotor for plasticizing same.

(6) A plasticizing apparatus, as aforesaid, which can be quickly and sequentially used for different colored plastic material without requiring complete disassembly and cleaning thereof.

(7) A plasticizing apparatus, as aforesaid, capable of simultaneously producing a plurality of blow molded articles.

(8) A plasticizing apparatus, as aforesaid, capable of producing a plurality of different sized or shaped blow molded articles.

(9) A plasticizing apparatus, as aforesaid, capable of producing a plurality of different colored blow molded articles.

(10) A plasticizing apparatus, as aforesaid, capable of simultaneously producing a plurality of blow molded articles having different sizes, shapes and colors.

(11) A plasticizing apparatus, as aforesaid, which is relatively simple and inexpensive to manufacture and operate, and further is adaptable to a wide range of blow molding operating conditions.

(12) A plasticizing apparatus, as aforesaid, which is inexpensive to operate and requires a minimum of repair and maintenance.

BRIEF DESCRIPTION OF DRAWINGS

FIGURE 2 is a partial sectional view taken along the line II—II of FIGURE 1.

The drawings attached herewith are merely for purposes of illustration and are not limiting of the invention since many modifications of the structure illustrated would be obvious to one of ordinary skill in the art, such modifications being encompassed within the invention herein disclosed and described.

In the following description, certain terminology will be utilized for convenience and reference only and will not be limiting. For instance, the terms "rightward" and "leftward" will refer to the respective directions illustrated in the attached drawings. Further, the terms "upward" and "downward" will similarly refer to the respective directions illustrated in the attached drawings. The terms "inward" and "outward" will refer to directions relative to the geometrical center of the apparatus or of the respective components thereof. The above explanation will similarly apply to derivatives of the above words and words of similar import.

DETAIL DESCRIPTION

Figure 3:
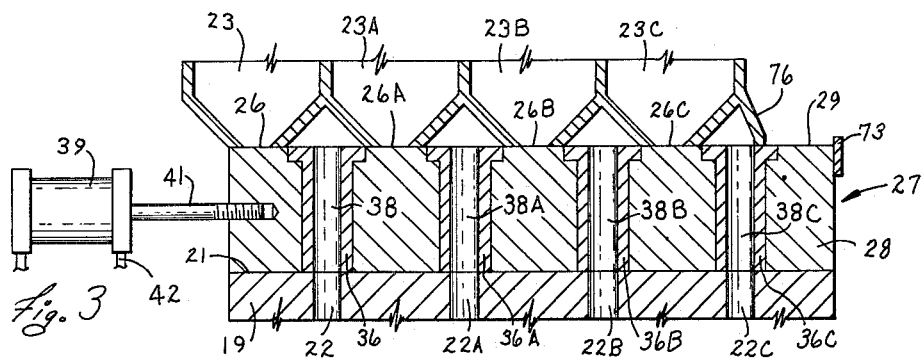
FIGURE 3 is a partial sectional view taken along the line III—III of FIGURE 1.
Figure 4:
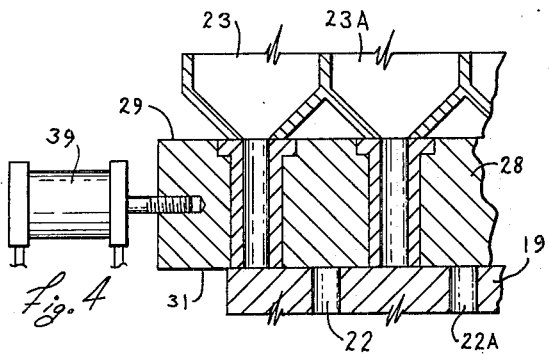
FIGURE 4 is a partial sectional view similar to FIGURE 3 showing the feed block in a different operating position.

FIGURES 1–4 illustrate a preferred form of the blow molding plasticizing apparatus of the present invention. FIGURES 3 and 4 illustrate the present invention as containing four separate but simultaneously operated plasticizing devices whereby four separate and distinct parisons can be simultaneously produced. While the drawings and the description disclose the present invention as containing a grouping of four plasticizing devices, such grouping has been chosen merely for purposes of illustration and is not limiting of the invention. The present invention can be readily utilized with either less than or more than four plasticizing devices being grouped together for simultaneous operation, this being a mere matter of design choice. Further, the plasticizing apparatus of the present invention is also advantageously useable as a single unit if so desired, the invention not being limited to a grouping of units such as is illustrated.

Since many of the parts and components of the individual plasticizing units are identical in construction and operation, for convenience in reference, only one unit will be described with the identical parts of the other units being given corresponding reference numerals with the suffix "A", "B" or "C" added thereto respectively.

Figure 1:
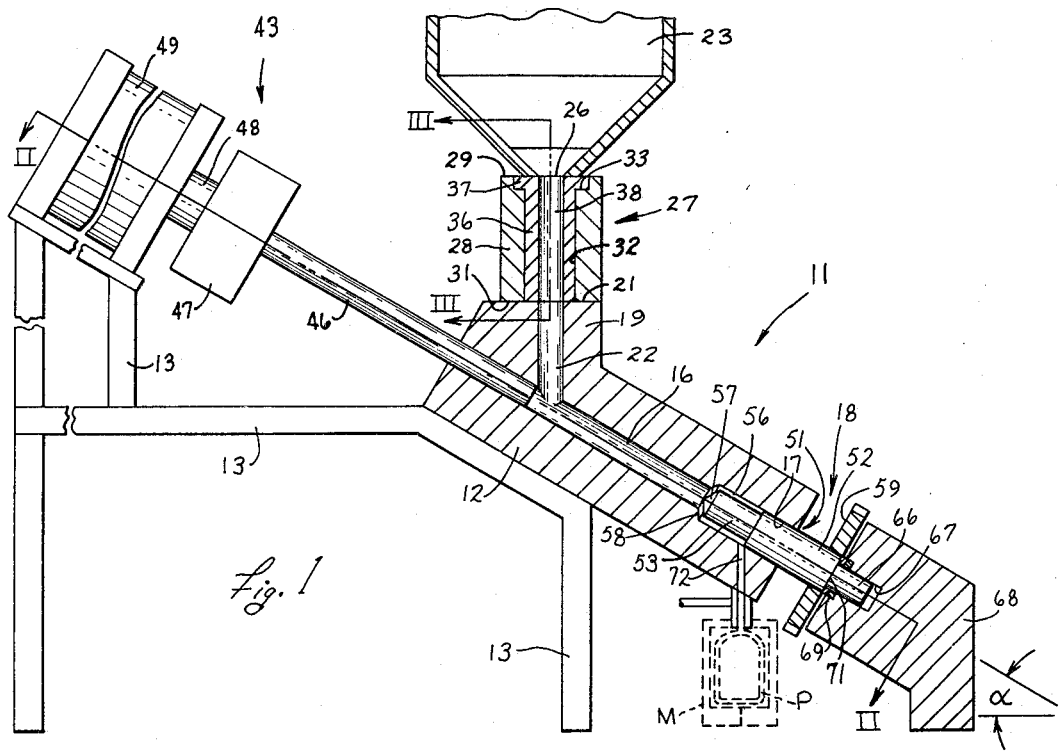
FIGURE 1 is a partial sectional elevational view illustrating one form of the plasticizing apparatus of the present invention.

FIGURE 1 illustrates a plasticizing unit generally designated as 11 comprising a housing 12 which is supported upon a frame 13, the details of the frame 13 being shown merely for purposes of illustration since any suitable frame or support means could be utilized. The housing 12 is formed with a cylindrical feed barrel opening 16 passing therethrough, the opening having an enlargement 17 formed at one end thereof for rotatably receiving therein a plasticizing means 18. The longitudinal axis of the opening 16 is preferably angularly inclined with respect to a horizontal position, the included angle between the axis and the horizontal position being generally designated as angle α.

The upper end of the housing 12 is formed with an enlargement 19 thereon, the upper surface of the enlargement being a horizontal planar surface 21. The enlargement is further provided with a substantially vertical feed opening 22 passing therethrough, the feed opening originating in the upper surface 21 and communicating with the barrel opening 16.

Mounted directly above and here vertically spaced from the upper surface 21 of the enlargement 19 is a hopper 23 having a feed opening 26 in the bottom thereof. The hopper 23 is used for the storage of particulate plastic material and may be of any desired shape or configuration as is well known in the art. Further, the hopper may be open to the atmosphere or it may be closed and connected to a vacuum means so as to eliminate the volatiles from the system if so desired. As is illustrated in FIGURE 3, the hopper feed opening 26 is laterally spaced from the feed opening 22 for a purpose to be explained hereinafter.

A volumetric control means, indicated generally at 27, is positioned between the bottom of the hopper 23 and the upper surface 21 of the housing so as to control the transfer of particulate material to the plasticizing region. In particular, the volumetric control means comprises a reciprocal feed block 28 having upper and lower surfaces 29 and 31 respectively, the upper surface 29 being slideably engaged with the bottom of the hopper adjacent the feed opening therein and the lower surface 31 being in sliding bearing engagement with the upper surface 21 of the housing. The feed block is formed with a cylindrical opening 32 passing therethrough having an enlarged recess 33 formed at one end thereof adjacent the upper surface 29. A replaceable sleeve or cup member 36 is positioned within the opening 32, the sleeve having an annular flange 37 formed on the upper end thereof receivable in the recess 33 so as to properly position the sleeve within the feed block. The sleeve 36 is loosely and slideably received in the opening 32 whereby the sleeve can be easily removed and replaced by another sleeve member. The sleeve is provided with a volumtric opening 38 passing therethrough, the volume of the opening 38 being utilized as a measuring means for determining the quantity of particulate material transferred from the hopper to the plasticizing unit. When it is desired to increase or decrease the quantity of material transferred per cycle of operation, it is only necessary to replace the sleeve presently being utilized by another similar sleeve having a different sized volumetric opening 38 therein.

As is shown in FIGURES 3 and 4, the feed block 28 is mounted for horizontal reciprocation in a direction substantially transverse to the axis of the barrel opening 16. The feed block is moved by any suitable reciprocal power means, such as a fluid pressure cylinder 39, the cylinder being connected to the feed block 28 by means of the piston rod 41 whereby reciprocation of the cylinder piston causes the feed block to be similarly reciprocated. The power cylinder 39 can be mounted on any suitable frame or fixed support means 42. The feed block is preferably reciprocable between first and second positions such that when the feed block is in the first position (as illustrated in FIGURE 4), the volumetric opening 38 of the cup member is directly aligned beneath the hopper feed opening 26 whereby material from the hopper falls by gravity into the volumetric opening so as to fill the same. The lower end of the opening is closed by means of the upper surface 21 of the housing.

After the volumetric opening is filled with plastic material, energization of the cylinder 39 causes the feed block 28 to move rightwardly as viewed in FIGURE 4. Rightward movement of the feed block causes the volumetric opening 38 to move out from underneath the hopper feed opening 26 whereby the same is sealed by means of the upper surface 29 of the feed block. Further rightward movement causes the feed block to assume a second position (as illustrated in FIGURE 3) wherein the lower end of the volumetric opening 38 is axially aligned above the feed opening 22 contained within the housing 11 whereby the material contained within the volumetric opening 38 falls by means of gravity through the opening 22 into the cylindrical barrel opening 16. If desired, suitable stop means can be utilized to control the limits of reciprocation of the feed block 28. For instance, a stop member 73 can be mounted on the feed block 28 and a cooperating fixed stop member 76 can be mounted on the hopper 23 so as to limit the leftward movement (as viewed in FIGURE 3) of the feed block as it moves into the first position as illustrated in FIGURE 4.

The plasticizing apparatus further contains a compression means indicated generally at 43 so as to facilitate the plastification of the particulate material. The compression means comprises a reciprocating ram member 46 the extending end of which is slideably but snugly received within the upper end of the barrel opening 16. The other end of the reciprocating ram 46 is connected to a coupling member 47 which in turn is connected to a piston rod 48 of a fluid pressure power cylinder 49. The power cylinder 49, which may be either pneumatically or hydraulically actuated, is alternately energized so as to reciprocate the piston rod 48, which in turn causes the ram 46 to slideably reciprocate within the barrel opening 16. As illustrated in FIGURE 1, the piston rod 48 and the ram 46 is in its retracted or withdrawn position such that energization of the power cylinder 49 would cause the ram 46 to move downwardly and extend further into the barrel opening 16. The power cylinder 49 is fixedly supported by any suitable frame means such as illustrated at 13.

Rotatably received within the housing 11 in the end thereof opposite the ram 46 is a plasticizing means 18 comprising a conical rotor member 51 having first and second cylindrical portions 52 and 53 respectively. This conical rotor structure is thoroughly disclosed in my copending application Ser. No. 612,676, now Patent No. 3,358,334, and will only briefly be described herein. The first cylindrical portion 52 is of a diameter substantially equal to but slightly less than the interior diameter of the enlarged opening 17 so as to be snugly but rotatably recived therein. On the other hand, the second cylindrical portion 53 is of a substantially smaller diameter than the interior diameter of the opening 17 whereby an annular passageway 56 is formed therebetween. The rotor 51 is further formed with the conical plasticizing face 57 formed on the end thereof coaxially aligned with the barrel opening 16. Housing 11 is formed with a conical seat 58 formed therein closely surrounding the conical face 57 for a purpose to be explained hereinafter. The conical seat 58 formed within the housing 11 interconnects the barrel opening 16 with the enlarged opening 17.

The plasticizing rotor 51 is rotataably driven by means of a drive gear 59 which is fixedly secured thereto near the end of the first cylindrical portion 52, the drive gear 59 being in mesh with a drive pinion 61 (see FIGURE 2) which is secured to the drive shaft 62 of a motor or other suitable drive means 63.

The end of the conical rotor 51 opposite the plasticizing face 57 is formed with a bearing stub shaft 66 thereon which is rotatably received within a cylindrical opening 67 formed in the support member 68. The rotor 51 is axially positioned by means of thrust rings 69 which are positioned between the support member 68 and the shoulder 71 interconnecting the first cylindrical portion and the bearing stub shaft. The thrust rings 69 also transmit all axial thrust loads from the rotor to the support member 68. However, if desired, the thrust rings 69 could be replaced by a conventional antifriction bearing means capable of taking both radial and axial thrust loads.

Housing 12 is further formed with a small opening 72 therein, which opening communicates with the annular passageway 56 which surrounds the plasticizing rotor. The purpose of the opening 72 will be explained hereinafter.

The description given above has related solely to the construction and operation of a single plasticizing unit. However, as illustrated in FIGURES 2-4, the plasticizing apparatus of the present invention can be utilized with a plurality of individual plasticizing units interconnected for simultaneous operation. FIGURE 2 illustrates four such plasticizing units interconnected for simultaneous operation, the additional units being designated as A, B and C. Since each of the units are identical in construction and operation, the detailed description given above applies equally well to the units A, B and C. However, the following additional explanation will assist in a more complete understanding thereof.

As shown in FIGURE 2, the plasticizing apparatus comprises a single unitary housing 12 having four plasticizing units mounted therein. Each plasticizing unit comprises a conical rotor 51 coaxially aligned with a cylindrical barrel opening 16, which barrel opening has a ram 46 reciprocally mounted therein. The four ram members 46–46A–46B–46C are all rigidly interconnected to a single coupling member 47 so as to be simultaneously actuated by a single power cylinder 49. Similarly, the four rotor members 51–51A–51B–51C are all drivingly interconnected by means of gears 59–59A–59B–59C so as to be simultaneously rotated by means of a single power source 63. Further, each of the cylindrical barrel openings 16–16A–16B–16C is in communication with its own respective feed opening 22–22A–22B–22C.

As shown in FIGURE 3, the reciprocal feed block 28 is provided with four replaceable sleeve or cup members 36–36A–36B–36C therein, each cup member aligning with a respective feed opening 22–22A–22B–22C of each unit when the feed block is in one extreme position as illustrated in FIGURE 3. Similarly, when the feed block is in the other extreme position as illustarted in FIGURE 4, each cup or sleeve member aligns with a respective feed opening 26–26A–26B–26C contained within the hopper 23. If desired, the hopper 23 can similarly be partitioned off into individual hoppers 23–23A–23B–23C such that each hopper feeds only its own respective plasticizing unit whereby different colors and types of particulate plastic material can be contained within each hopper. On the other hand, if desired, the hopper 23 can be formed as one single continuous hopper whereby all of the plasticizing units are fed with the same type of material.

OPERATION

While the operation of the plasticizing apparatus of the present invention should be apparent from the above description, a brief summary of the operation will be given below to assure a clear understanding thereof.

When it is desired to initiate operation of the plasticizing apparatus of the present invention, assuming that each plasticizing unit is empty of plastic material, the rams 46 will be moved to their withdrawn position as illustrated in FIGURE 1 and the feed block will be moved into its second position as illustrated in FIGURE 3 wherein the hopper feed openings 26 are affectively sealed by the upper surface 29 of the feed block.

To initiate operation, the hoppers 23 are first filled with the desired particulate plastic material. Power cylinder 39 is energized to move the feed block from the second position as illustrated in FIGURE 3 to the first position as illustrated in FIGURE 4 whereby the respective volumetric openings 38 are aligned with the hopper feed openings 26. Material from the hopper then falls from the hopper into the volumetric openings 38 so as to fill the same. Since the lower end of the openings 38 are sealed by means of the upper surface 21 of the housing, each sleeve or cup member 38 contains a precise quantity of particulate material as determined by the volume of the opening 38. The power cylinder 39 is now energized in the reverse direction so as to move the feed block 28 rightwardly as viewed in FIGURE 4. Initial rightward movement of the feed block causes the openings 38 to be displaced laterally from the hopper feed openings 26 whereby the latter openings are closed by means of the upper surface 29 of the feed block. Continual rightward movement of the feed block 28 occurs until the feed block reaches the position illustrated in FIGURE 3 wherein the volumetric openings 38 are aligned with the feed openings 22 contained within the housing. The precise quantity of material contained within the respective openings 38 then falls into the respective feed openings 22, which openings are in communication with respective barrel openings 16. The material falls through the openings 22 into the respective barrel openings 16 and, due to the angular inclination of the barrel openings 16, the material slides therealong due to gravity until the same comes into contact with the conical face 57 of the respective plasticizing rotor 51. Due to the angular inclination of all the passageways, all of the particulate material contained within the respective volumetric openings 38 will be assured of being transferred into the region adjacent the respective conical plasticizing face 57.

After the particulate material has been deposited adjacent the conical face 57, the power cylinder 49 will be energized so as to extend the rams 46 into the housing. The initial movement of the rams 46 will cause same to move past the junction between the openings 16 and 22 whereby the openings 22 are thus sealed so as to prevent any more particulate material from entering into the openings 16. Continued forward movement of the rams 46 into the barrel opening (rightwardly as viewed in FIGURE 1) will cause the ends of the rams to contact the particulate material and to compress the same against the rotating conical plasticizing faces 57. Simultaneously therewith, the rotors 51 will be driven at relatively high rotational speeds by means of the motor 63. Due to the compression of the rams 46, plastic material will be forced into the small passageways between each conical face 57 and the respective surrounding seat 58. Due to the high rotational speed of the rotors 51, the plastic material compressed against each conical face 57 adjacent the respective seat 58 will be frictionally heated and plasticized, which material will then move radially outward along the respective conical face 57 until the same reaches the respective annular passageway 56. The material will then move axially along the passageways 56 until reaching the openings 72 whereby the material will move outwardly through the openings 72 and will be formed into parisons P for blow molding by any suitable, conventional apparatus generally indicated at M.

The plasticizing apparatus as described above is thus able to form four parisons simultaneously while utilizing only a single power source for actuating a plurality of rotors. Furthermore, if it is desired to simultaneously form various sized parisons, replaceable sleeves 36 can be utilized having different sized volumetric openings therein whereby the adjacent plasticizing units will simultaneously form different sized parisons.

While the angular inclination α of the barrel openings 16 is not critical, it has been found preferable to operate the plasticizing apparatus of the present invention with an inclination of between 25 and 35 degrees. However, the inclination α can vary anywhere from approximately 15 degrees up to 90 degrees.

While operation of the power cylinders 39 and 49 of the above apparatus could be controlled manually, it is of course desirable to automate the apparatus so as to permit the same to continuously and cyclically produce the desired parisons. Automating the present apparatus so as to cycle and recycle can easily be done merely by utilizing a suitable electrical or fluid pressure control circuit for interconnecting the power cylinders 39 and 49 for sequentially operating the same, such control circuits being well known to those skilled in the art.

While the plasticizing apparatus as described above has been illustrated as comprising a plurality of individual plasticizing units mounted within a single unitary housing, it is of course obvious that each plasticizing unit could be constructed with its own individual housing and reciprocal feed block, with the respective housings and feed blocks being fixedly interconnected so as assemble any desired number of units into a combined plasticizing apparatus.

MODIFICATION

Figure 5:
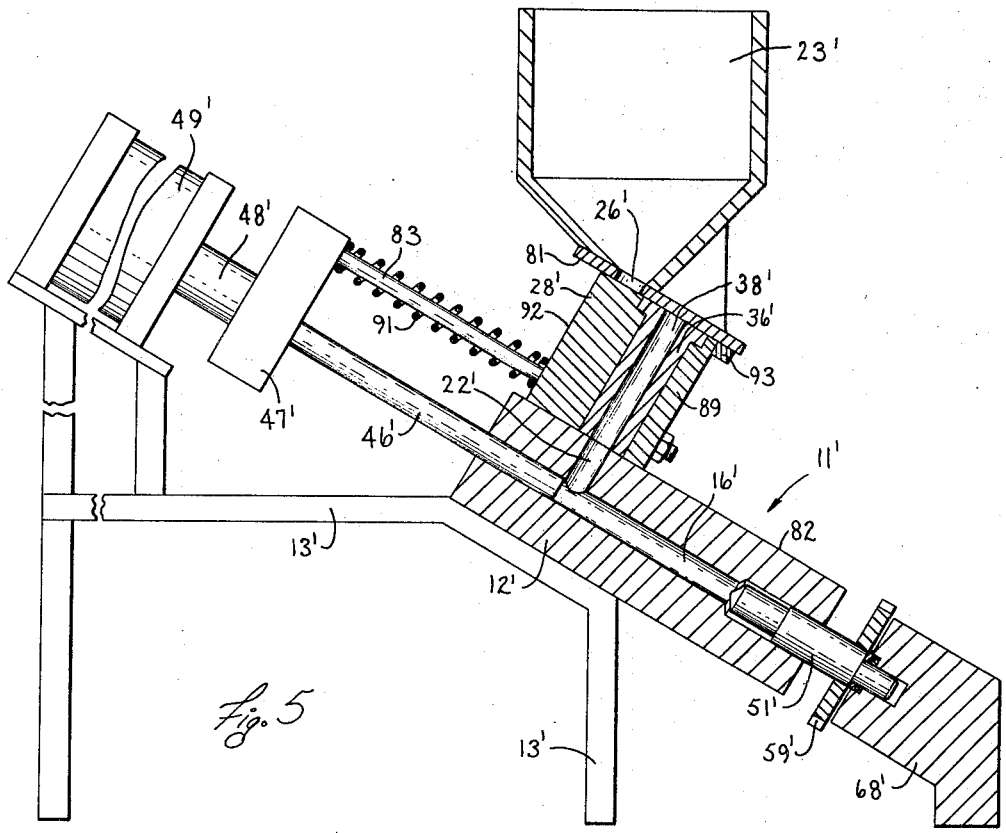
FIGURE 5 is a partial elevational sectional view similar to FIGURE 1 showing a modified form of the invention.

FIGURE 5 illustrates a sectional elevational view of a modified form of the present invention. Since many of the parts and components of the device are identical to the structure as described above, corresponding parts have been designated by the same reference numerals utilized above with a prime (′) added thereto.

The plasticizing apparatus comprises a plasticizing unit generally designated as 11′ comprising a housing 12′ mounted upon a fixed or stationary frame 13′. The housing has a cylindrical barrel opening 16′ extending therethrough with a plasticizing rotor 51′ being rotatably received within one end thereof, the plasticizing rotor being supported within a support member 68′ and having a drive gear 59′ fixedly secured thereto whereby the rotor is driven by an external power source (not shown).

A ram 46′ is slideably but snugly received within the outer end of the opening 16′, the ram being connected to a coupling member 47′ which in turn is connected to the piston rod 48′ of the power cylinder 49′. Housing 12′ is further provided with a feed opening 22′ which communicates with the barrel openings 16′ at an intermediate location between the plasticizing rotor and the reciprocating ram when the ram is in its retracted position as illustrated in FIGURE 5.

A feed hopper 23′ is vertically positioned above the barrel 12′ and is vertically separated therefrom. The hopper is provided with a guide plate 81 on the lower surface thereof, the guide plate being inclined with respect to a horizontal position and being substantially parallel to the upper surface 82 of the housing 12′. The guide plate 81 is formed with a hopper feed opening 26′ therein, which opening is laterally spaced from the feed opening 22′ formed within the housing.

Figure 6:
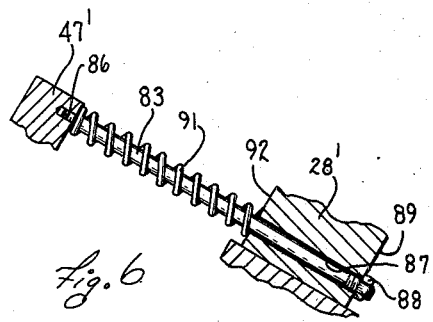
FIGURE 6 is a partial sectional view illustrating the driving connection between the ram and the feed block.

A reciprocating feed block 28′ is slideably mounted between the guide plate 81 and the upper housing surface 82, the feed block being mounted for reciprocatory motion in a direction substantially parallel to the axis of the cylindrical barrel openings 16′. The feed block is provided with a replaceable sleeve or cup 36′ therein, which sleeve has a volumetric opening 38′ therethrough, which opening alternately communicates with the hopper feed opening 26′ and the housing feed opening 22′ when the feed block 28′ is in its extreme reciprocatory positions. Feed block 28′ is further interconnected to the coupling member 47′ by means of a pair of tie members 83, only one of which is illustrated in FIGURES 5 and 6. One end 86 of tie member 83 is threadedly interconnected to the coupling member 47′ while the other end of the tie member is slideably received within a cylindrical opening 87 which passes through the reciprocating feed block 28′, the tie member being interconnected to the feed block by means of a nut 88 which is threadedly received on the end of the tie member so as to bear against the forward surface 89 of the feed block. A compression spring 91 surrounds the tie member and has one end thereof bearing against the coupling member 47′ with the other end thereof bearing against the rear surface 92 of the feed block, the spring thus biasing the tie member 83 with the nut 88 thereon into bearing engagement with the forward surface 89 of the feed block.

The remainder of the structure of the plasticizing apparatus shown in FIGURE 5 is identical to the structure as described above. Further, any desired number of plasticizing units can be positioned in parallel adjacent relationship so as to operate simultaneously as illustrated in FIGURES 1–4 above.

The operation of the embodiment illustrated in FIGURE 5 is basically identical to the operation of the embodiment illustrated in FIGURES 1–4 except that the FIGURE 5 embodiment requires only a single power cylinder 49′ so as to simultaneously operate both the ram 46′ and the reciprocating feed block 28′, while the previous embodiment required two separate cylinders so as to individually operate the ram and the feed block respectively. However, the cylinder 49′ must be provided with a longer working stroke than was necessary for the cylinder 49 utilized in the FIGURE 1 embodiment.

In initiating operation, with the device in the position illustrated in FIGURE 5, the power cylinder 49′ will be energized to retract the feed block 28′ (leftwardly in FIGURE 5) until the feed cup 36′ is positioned beneath the hopper feed opening 26′ whereby the volumetric opening 38′ will be initially filled with particulate material. Energization of the power cylinder 49′ in the reverse direction will then cause the ram 46′ and the feed block 28′ to be reciprocated to the right as viewed in FIGURE 5, the spring 91 being of sufficient stiffness so as to drive the feed block 28′ therethrough. When the feed block reaches the position wherein the volumetric opening 38′ will be aligned with the housing feed opening 22′, the block will strike the fixed stop 93 so as to prevent further movement thereof. In this position, the material contained within the volumetric opening 38′ will fall by gravity therefrom into the feed opening 22′ and from thence into the cylindrical barrel opening 16′. Continued forward movement of the power piston 48′ will cause the ram 46′ to move past the opening 22′ so as to effectively seal the same so as to prevent further material from entering the opening 16′ whereby the ram 46′ will compress the particulate material against the rotor 51′. After the feed block 28′ contacts the stop 93, continued forward movement of the power piston 48′ will cause the tie rod 83 to slide through the opening 87 formed within the feed block, the latter action being accompanied by a compression of the spring 91. When the power cylinder 49′ is energized in the reverse direction so as to return the ram to its initial position, the return movement of the coupling member 47′ with the tie member 83 connected thereto will cause the nut 88 to contact the forward surface 89 of the feed block 28′ so as to move the same back into its initial position wherein the volumetric opening 38' will again be directly positioned behind the hopper feed opening 26' so as to initiate a new cycle of operation.

The embodiment illustrated in FIGURE 5 thus permits the feed block and the ram to be simultaneously operated by a single cylinder, thus eliminating the need for a second cylinder and related control circuitry for interconnecting the same for automatic sequential operation.

As is apparent from the description of the two embodiments of the present invention as given above, the plasticizing apparatus of the present invention permits precise and positive control over a predetermined quantity of particulate plastic material whereby said quantity of material is plasticized and positively controlled for use in a blow molding operation. Furthermore, the apparatus as described is readily adaptable for simultaneously producing not only a plurality of articles with a minimum of mechanical complexity, but it is also well adapted for simultaneously producing a plurality of different sized or shaped articles requiring different quantities of material and is also well adapted for simultaneously producing a plurality of articles from different colored plastic material. Further, utilization of a frictional-type plasticizing rotor results in precise volume control not previously obtainable in most prior art blow molding plasticizing apparatus, and further results in a device requiring less maintenance and repair than the prior art plasticizers.

While particular embodiments of the present invention have been described for illustrative purposes, it will be apparent that many modifications and changes within the above described embodiments will be obvious to those having ordinary skill in the art and thus such changes are within the contemplated scope of the invention, the invention being limited solely by the scope of the appended claims.

The embodiments of the invention in which an exclusive property or privilege is claimed are defined as follows:

1. An apparatus for the plastification of particulate plastic material for blow molding comprising:
   a housing having feed and discharge openings therein;
   a plastification rotor rotatably mounted within said housing at one end of said feed opening;
   feed means spaced from said feed opening for depositing a predetermined quantity of particulate plastic material therein;
   ram means slideably mounted within said feed opening and power means operably coupled to said ram means for reciprocation thereof;
   parison forming means arranged for receiving material exiting from said discharge opening; and
   whereby said feed means deposits particulate plastic material into said feed opening and said ram compresses said material against said rotor for plastification thereof and then expels same for immediate forming into a parison.

2. The apparatus defined in claim 1 wherein said plastification rotor has a conical plasticizing surface thereon.

3. The apparatus as defined in claim 2 wherein said feed means includes both hopper means positioned above said housing and volumetric control means intermediate said housing and said hopper means, said volumetric control means permitting a predetermined quantity of particulate plastic material to be deposited into said feed opening.

4. The apparatus as defined in claim 3 wherein said volumetric control means comprises a feed slide mounted for reciprocal movement between first and second positions, said feed slide containing a volumetric cup therein for transferring a predetermined quantity of material from said hopper means to said feed opening, said cup being filled with material when said slide is in said first position and depositing said material into said feed opening when said cup is in said second position, said cup being replaceable whereby the predetermned quantity of material transferred from the hopper means to the feed opening is readily varied.

5. The apparatus as defined in claim 3 wherein said feed opening is inclined at an angle of between 25 and 35 degrees with respect to a horizontal position.

6. The apparatus as defined in claim 1 wherein said housing contains a plurality of parallel feed openings therein, each of said feed openings having a separate slideable ram therein, said plurality of rams being interconnected to a single power means for simultaneous operation thereof, each of said feed openings further having a plastification rotor rotatably mounted within one end thereof.

7. The apparatus as defined in claim 6 wherein said plastification rotors are each formed with a conical plastification surface thereon, said rotors being interconnected for simultaneous rotation thereof.

8. The apparatus as defined in claim 7 wherein said feed means includes both hopper means positioned above said housing and volumetric control means positioned intermediate said hopper means and said housing for controlling the transfer of particular plastic materials from said hopper means to said feed openings, said feed means permitting a predetermined qauntity of material to be simultaneously deposited into each of said feed openings.

9. The apparatus as defined in claim 8 wherein said volumetric control means comprises a feed slide mounted for reciprocal movement between first and second positions, said feed slide having a plurality of volumetric cups therein, there being a single cup corresponding to each feed opening whereby each feed opening has simultaneously deposited therein a predetermined quantity of particulate material, said cups receiving a predetermined quantity of material therein from said hopper means when said slide is in said first position and said cups depositing said predetermined quantity of material into their respective feed openings when said cups and said slide are in said second position, said cups being individually replaceable whereby the predetermined quantity of material deposited into each of the feed openings can be readily varied so as to permit simultaneous plastification of different predetermined quantities of material by the individual rotors of the apparatus, thus permitting the simultaneous formation of different sized parisons.

10. The apparatus as defined in claim 8 wherein said feed means comprises a plurality of hoppers positioned abose said housing, each of said hoppers corresponding to and supplying a respective feed opening, said volumetric control means comprising a feed slide having a plurality of volumetric cups therein, each of said cups corresponding to a respective hopper and feed opening, said slide being reciprocable between first and second positions with said slide in said first position causing said cups to be positioned beneath their respective hoppers for filling the individual cups with a predetermined quantity of particulate material, movement of said slide to said second position causing said hoppers to be closed and causing said cups to be positioned over their respective feed openings for depositing the predetermined quantity of particulate material therein, said plurality of hoppers being fillable with either the same or different colors of particulate material whereby a plurality of parisons of the same or different colors are simultaneously produced.

11. The apparatus as defined in claim 8 wherein the feed openings are inclined at an angle of between 25 and 35 degrees with respect to a horizontal position whereby the material deposited in the feed openings will fall by means of gravity into contact with the conical surface on the plasticizing rotor.

12. The apparatus as defined in claim 1, wherein said plasticification rotor has a conical plasticizing surface thereon, and wherein said feed means includes (1) hopper means positioned above said housing and (2) volumetric control means intermediate said housing and said hopper means, said volumetric control means permitting said predetermined quantity of particular plastic material to be deposited into said feed opening.

References Cited

UNITED STATES PATENTS

| | | |
|---|---|---|
| 2,256,081 | 9/1941 | Farley. |
| 2,746,089 | 5/1956 | Hendry. |
| 3,256,568 | 6/1966 | Stenger. |

FOREIGN PATENTS

| | | |
|---|---|---|
| 736,551 | 9/1955 | Great Britain. |
| 332,335 | 11/1935 | Italy. |

J. SPENCER OVERHOLSER, Primary Examiner

MICHAEL O. SUTTON, Assistant Examiner.

U.S. Cl. X.R.

222—429, 430